United States Patent
Hoffrichter et al.

(10) Patent No.: US 6,851,527 B2
(45) Date of Patent: Feb. 8, 2005

(54) BRAKE SHOE WITH GROOVED FRICTION LINING

(75) Inventors: Wolfgang Hoffrichter, Cologne (DE); Wilfried Schnell, Lindlar (DE); Christian Wiaterek, Odenthal (DE); Gerhard Kurz, Augsburg (DE); Georg Eichner, Ismaning (DE)

(73) Assignee: TMD Friction GmbH, Leverkusen (DE)

( * ) Notice: Subject to any disclaimer, the term of this patent is extended or adjusted under 35 U.S.C. 154(b) by 0 days.

(21) Appl. No.: 10/362,054

(22) PCT Filed: Aug. 1, 2001

(86) PCT No.: PCT/EP01/08915
§ 371 (c)(1),
(2), (4) Date: Jul. 18, 2003

(87) PCT Pub. No.: WO02/16794
PCT Pub. Date: Feb. 28, 2002

(65) Prior Publication Data
US 2004/0003973 A1 Jan. 8, 2004

(30) Foreign Application Priority Data
Aug. 23, 2000 (DE) .......................... 100 41 294

(51) Int. Cl.⁷ .................. F16D 65/092; F16D 69/00
(52) U.S. Cl. ................. 188/251 A; 188/261; 188/250 E
(58) Field of Search .................... 188/250 B, 250 R, 188/251 A, 250 E, 257, 261, 259, 255, 256, 73.36, 73.37

(56) References Cited

U.S. PATENT DOCUMENTS

| | | | | |
|---|---|---|---|---|
| 2,850,124 A | * | 9/1958 | Grote | 188/251 R |
| 4,273,219 A | * | 6/1981 | Ito | 188/256 |
| 4,338,758 A | * | 7/1982 | Hagbjer | 52/745.2 |
| 4,715,486 A | * | 12/1987 | Burgdorf et al. | 192/107 M |
| 4,926,978 A | * | 5/1990 | Shibata et al. | 188/73.1 |
| 5,407,034 A | * | 4/1995 | Vydra et al. | 188/73.37 |
| 5,474,159 A | * | 12/1995 | Soennecken et al. | 188/251 A |
| 5,597,053 A | * | 1/1997 | Weng | 188/256 |
| 6,167,992 B1 | * | 1/2001 | Torpey et al. | 188/73.1 |
| 6,283,258 B1 | * | 9/2001 | Chen et al. | 188/250 E |

* cited by examiner

Primary Examiner—Thomas Williams
(74) Attorney, Agent, or Firm—Diller, Ramik & Wight

(57) ABSTRACT

In a brake shoe (1), particularly for a disk brake of motor vehicles, comprising a carrier plate (2) on which a friction lining (6) is fastened, in which outwardly open grooves (8) are arranged in a groove pattern, it is provided that for the reduction of moment vibrations during the braking procedure, the grooves (8) are filled up with an elastic filler (12) that does not consist of abrasive material.

20 Claims, 1 Drawing Sheet

BRAKE SHOE WITH GROOVED FRICTION LINING

BACKGROUND OF THE INVENTION

The invention relates to a brake shoe according to the precharacterizing part of claim 1.

Such brake shoes are particularly suitable for disk brakes of motor vehicles and comprise a carrier plate of metal on which a friction lining is fastened, preferably by glueing. Between the friction lining and the carrier plate, an intermediate layer may be arranged that, on the one hand, has a vibration-damping effect and, on the other hand, glues the friction lining to the carrier plate.

Friction linings are known that comprise grooves in a certain pattern and extending down to at least the intermediate layer.

A disadvantage of the known friction linings consists in that the strength of the friction linings is low and a breakout of friction lining sections under high mechanical load of the brake shoe is not excluded.

SUMMARY OF THE INVENTION

It is the object of the invention to provide a brake shoe that is able to reduce moment variations during the braking procedure while having a high mechanical strength.

This object is solved by the features of claim 1.

The invention advantageously provides that, for the reduction of moment variations during the braking procedure, the grooves are filled up with an elastic filler that does not consist of abrasive material. The filler connects the lining sections located between the grooves so that the strength of the friction lining as a whole is increased. The reduced stiffness of the lining permits a better adaptation of the friction lining to the unevennesses of a brake disk since the friction lining is able to elastically deform. This leads to an avoidance of rubbing noise and vibrations due to the reduction of the moment variations. The rubbing caused by form defects of the brake disk or so-called hot spots on the brake disk, which expresses itself in torsional vibrations of the steering wheel, pedal pulsation and buzzing, is reduced. Hot spots are sites with excess local temperature on the brake disk which lead to local raisings on the disk due to their extension and thus cause vibrations. Finally, the filler arranged between the grooves leads to a silencing of noises. Moreover, an improvement of the fading characteristics is achieved since a better degassing of the friction lining is made possible. Finally, a better conveyance of wear particles can be effected.

Between the carrier plate and the friction lining, a vibration-damping intermediate layer may be arranged.

In a first embodiment, it is provided that the filler in the grooves consists of a cured liquid resin.

Alternatively, the filler may consist of a liquid caoutchouc in latex phase, a pasty rubber mixture or of silicone.

Finally, the filler may consist of resins, of novolak or resoles that are unmodified or organically or inorganically modified.

The afore-mentioned fillers may contain abrasive substances or grinding particles.

Furthermore, the filler may contain organic and/or inorganic fibers, e.g., metal fibers, for the reinforcement of the filler.

The modulus of elasticity of the elastic filler amounts to 0.01 to 10 KN/mm², preferably 0.1 to 5 KN/mm².

Preferably, the grooves are arranged in parallel and/or orthogonally to a radial axis of symmetry of the friction lining.

Alternatively, with respect to the rotational axis of a disk brake, the grooves may also extend radially in the friction lining.

According to a further alternative, the grooves are arranged mirror-symmetrically to a radial axis of symmetry of the friction linings.

According to a further alternative, it is provided that the grooves extend at an angle to a radial axis of symmetry of the friction lining.

The grooves may also be only partially filled up by filler.

Hereinafter, embodiments of the invention are explained in detail with reference to the drawings.

DESCRIPTION OF THE PREFERRED EMBODIMENTS

Figure 1:
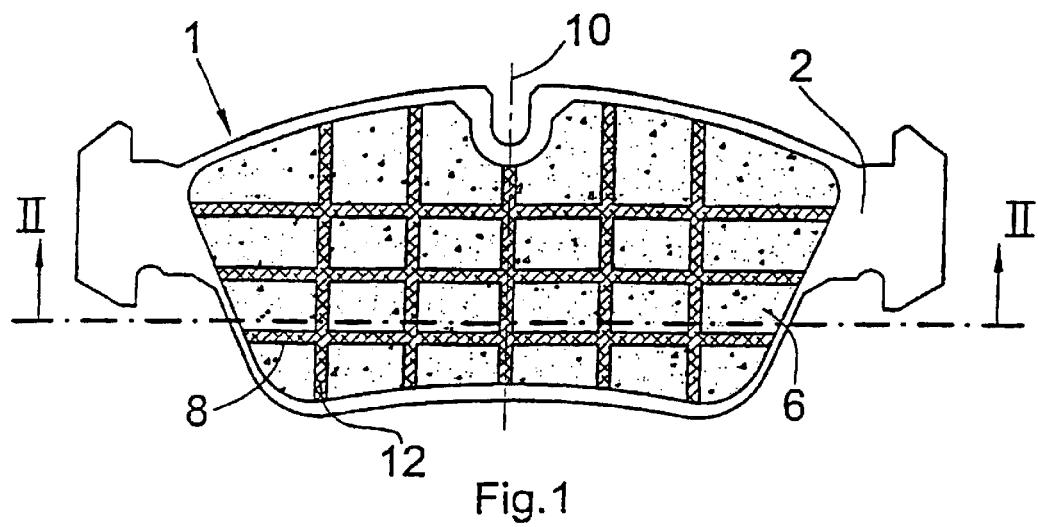
FIG. 1 shows a friction lining with grooves extending orthogonally to each and filled with filler.

The brake shoe 1 for a disk brake of motor vehicles shown in FIG. 1 comprises a carrier plate 2 on which a friction lining 6 is glued, in which grooves 8 open towards the brake disk of the disk brake and towards the border region of the friction lining 6 are arranged in a groove pattern, the grooves 8 extending parallel to an axis of symmetry 10 of the brake shoe 1, on the one hand, and orthogonally thereto, on the other hand, so that they form a groove grid by which the friction lining 6 is divided into a plurality of lining sections.

The grooves 8 are filled up with a filler 12 elastically interconnecting the lining sections, the filler firmly sticking to the walls of the lining sections and thus effecting the increase in strength of the friction lining 6 divided into lining sections.

As filler 12, different materials can be used.

The filler 12, for example, may consist of an unmodified or modified liquid resin cured by polyaddition, polycondensation or radical polymerization.

Alternatively, the filler 12 may consist of a liquid caoutchouc in latex phase, of a pasty rubber mixture or of silicone.

As a filler, it is also possible to use novolak that is firmly introduced into solvent. The solvent may be dried under temperature, novolak being able to be cured at a temperature of up to 200° C.

Figure 2:
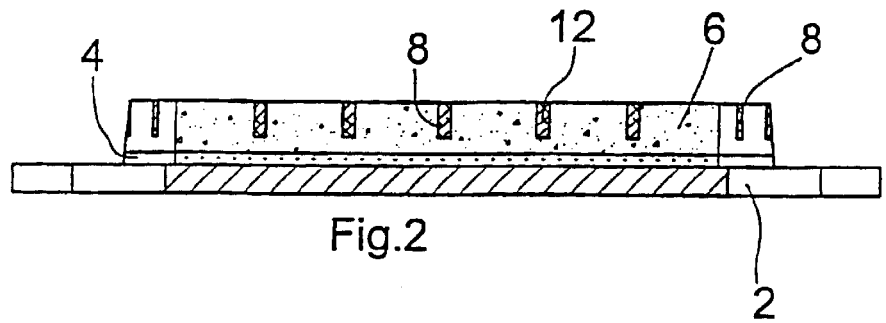
FIG. 2 shows a sectional view along the line II—II in FIG. 1.

To all the afore-mentioned fillers 12, abrasive substances/grinding particles as friction supporters and/or organic or inorganic fibers for mechanical stabilization may be added. The inorganic fibers may be synthetic mineral fibers, e.g., rock wool, and/or metal fibers, e.g., steel, copper, brass, bronze fibers in the form of wool or in From FIG. 2, it can be seen that the grooves 8 do not reach down to the intermediate layer 4 or to the carrier plate 2. Deviating from the representations in FIG. 2, it is also possible that the grooves 8 are not completely filled up with filler 12 (FIG. 3).

Figure 3:
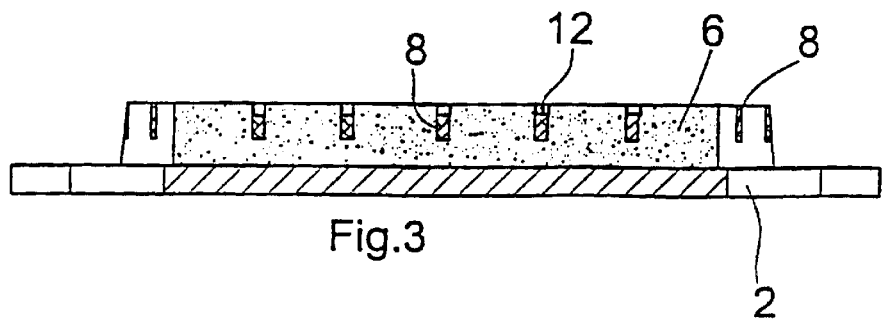
FIG. 3 shows a second embodiment without an intermediate layer and grooves partially filled with filler.

FIG. 3 shows an embodiment without an intermediate layer 4 and with the grooves 8 only partially filled with filler 12.

Although a preferred embodiment of the invention has been specifically illustrated and described herein, it is to be understood that minor variations may be made in the apparatus without departing from the spirit and scope of the invention, as defined by the appended claims.

What is claimed is:

1. A brake shoe comprising a carrier plate (2) provided with a friction lining (6) having an outermost friction surface adapted to engage an associated brake disk, said friction lining (6) including a peripheral edge portion, a plurality of intersecting grooves (8) in said friction lining (6) opening through said outermost friction surface with each groove ending contiguous said peripheral edge portion, said plurality of intersecting grooves (8) defining a plurality of friction lining sections disposed in spaced relationship to each other and occupying substantially the entirety of said outermost friction surface within said peripheral edge portion, and elastic filler means (12) devoid of abrasive material at least partially filing said plurality of intersecting grooves (8) for elastically interconnecting said friction lining sections thereby increasing the strength, reducing the stiffness and increasing the elastic deformation of the friction lining (6) to effect better outermost friction surface contact with an associated brake disk while reducing vibration and noise.

2. The brake shoe as defined in claim 1 wherein the elastic filler means (12) completely fills said plurality of intersecting grooves (8).

3. The brake shoe as defined in claim 1 wherein the elastic filler means (12) is a cured liquid resin.

4. The brake shoe as defined in claim 1 wherein the elastic filler means (12) is a liquid caoutchouc in latex phase.

5. The brake shoe as defined in claim 1 wherein the elastic filler means (12) is a pasty rubber mixture.

6. The brake shoe as defined in claim 1 wherein the elastic filler means (12) is silicone.

7. The brake shoe as defined in claim 1 wherein the elastic filler means (12) is one of resin, novolak and resoles that are one of unmodified and organically or inorganically modified.

8. The brake shoe as defined in claim 1 wherein the elastic filler means (12) contains one of organic fibers and inorganic fibers.

9. The brake shoe as defined in claim 1 wherein the elastic filler means (12) has a modulus of elasticity of substantially 0.01 to 10 $KN/mm^2$.

10. The brake shoe as defined in claim 1 wherein the elastic filler means (12) has a modulus of elasticity of substantially 0.01 to 5 $KN/mm^2$.

11. The brake shoe as defined in claim 1 wherein the plurality of intersecting grooves (8) are arranged in one of parallel and orthogonal relationship to a radial axis of symmetry (10) of the friction lining (6).

12. The brake shoe as defined in claim 1 wherein the plurality of intersecting grooves (8) extend radially relative to a rotational axis of an associated brake disk.

13. The brake shoe as defined in claim 1 wherein the plurality of intersecting grooves (8) extend in mirror-symmetrical relationship to a radial axis of symmetry (10) of the friction lining (6).

14. The brake shoe as defined in claim 1 wherein the plurality of intersecting grooves (8) extend at an angle to a radial axis of symmetry (10) of the friction lining (6).

15. The brake shoe as defined in claim 11 wherein the elastic filler means (12) has a modulus of elasticity of substantially 0.01 to 10 $KN/mm^2$.

16. The brake shoe as defined in claim 11 wherein the elastic filler means (12) has a modulus of elasticity of substantially 0.01 to 5 $KN/mm^2$.

17. The brake shoe as defined in claim 12 wherein the elastic filler means (12) has a modulus of elasticity of substantially 0.01 to 10 $KN/mm^2$.

18. The brake shoe as defined in claim 12 wherein the elastic filler means (12) has a modulus of elasticity of substantially 0.01 to 5 $KN/mm^2$.

19. The brake shoe as defined in claim 13 wherein the elastic filler means (12) has a modulus of elasticity of substantially 0.01 to 10 $KN/mm^2$.

20. The brake shoe as defined in claim 13 wherein the elastic filler means (12) has a modulus of elasticity of substantially 0.01 to 5 $KN/mm^2$.

\* \* \* \* \*